(12) United States Patent
Schletterer et al.

(10) Patent No.: US 7,636,209 B2
(45) Date of Patent: Dec. 22, 2009

(54) PRECISION MECHANICAL-OPTICAL SYSTEM AND METHOD FOR PRODUCING A COMPOSITE FROM OPTICAL ELEMENTS HELD INDIVIDUALLY IN MOUNTS

(75) Inventors: Thomas Schletterer, Stadtroda (DE); Andre Hillner, Jena (DE); Manfred Steinbach, Jena (DE)

(73) Assignee: JENOPTIK Laser, Optik, Systeme GmbH, Jena (DE)

( * ) Notice: Subject to any disclaimer, the term of this patent is extended or adjusted under 35 U.S.C. 154(b) by 0 days.

(21) Appl. No.: 12/143,176

(22) Filed: Jun. 20, 2008

(65) Prior Publication Data

US 2009/0002854 A1   Jan. 1, 2009

(30) Foreign Application Priority Data

Jun. 27, 2007   (EP) .................................. 07012568

(51) Int. Cl.
*G02B 7/02* (2006.01)
(52) U.S. Cl. ....................................... 359/819; 359/811
(58) Field of Classification Search ................. 359/819, 359/811
See application file for complete search history.

(56) References Cited

U.S. PATENT DOCUMENTS 5,239,417 A * 8/1993 Eguchi et al. ................ 359/823

| | | |
|---|---|---|
| 6,122,114 A | 9/2000 | Sudo et al. |
| 6,445,515 B2 | 9/2002 | Moennig |
| 6,445,516 B2 | 9/2002 | Osterreid |
| 6,574,053 B1 | 6/2003 | Spinali |
| 2007/0008627 A1 | 1/2007 | Matsumoto et al. |

FOREIGN PATENT DOCUMENTS

| | | |
|---|---|---|
| DE | 10259599 | 7/2004 |
| EP | 1148368 | 10/2001 |
| EP | 1164397 | 12/2001 |
| EP | 1646074 | 4/2006 |
| WO | 2005/116773 | 12/2005 |

\* cited by examiner

*Primary Examiner*—Jordan M. Schwartz
*Assistant Examiner*—James C Jones
(74) *Attorney, Agent, or Firm*—Duane Morris LLP

(57) ABSTRACT

In a precision mechanical-optical system, there is the problem of guaranteeing, for the production of a composite made from a plurality of mounted optical lenses, the mutual alignment of the optical axes during assembly and high strength of the composite after assembly with low expense in terms of equipment. Flanges are formed on the mounts for the optical elements, these flanges projecting outward in the radial direction and for adjacent mounts, abutting each other with facing joint surfaces, and are clamped by threaded connections tightening in the axial direction between paired, opposing bending elements.

8 Claims, 3 Drawing Sheets

PRECISION MECHANICAL-OPTICAL SYSTEM AND METHOD FOR PRODUCING A COMPOSITE FROM OPTICAL ELEMENTS HELD INDIVIDUALLY IN MOUNTS

FIELD OF THE INVENTION

The invention relates to a precision mechanical-optical system, which has a composite of optical elements that are held in mounts that are screwed together.

The invention further relates to a method for producing a composite of optical elements held individually in mounts.

BACKGROUND OF THE INVENTION

Optical systems of the highest imaging quality require that a plurality of optical lenses, which are mounted in a positionally stable and low stress way, are positioned with respect to one another in the range of a tenth of a micrometer and are connected rigidly together.

In DE 102 59 599 A1, a method is described for the threaded connection of several mounts with optical elements contained in these mounts. Several screws are provided, which are positioned along a circular path and which lie, with their screw heads via flat washers, on a topmost mount of a mount stack. According to the proposed method, regions surrounding the screws are measured using interferometry as reference regions of the mount surfaces after the threaded connection. The torque applied to each screw is varied in such a way that approximately identical interference patterns are produced.

A disadvantage is the high expense in terms of equipment, because mounting a lens always requires an interferometer. Indeed, deformation states in the threaded connection at surrounding areas of the screws can be determined with the interferometric measurements, but the determined interferometric measurement data does not guarantee that these threaded connections have sufficient properties in terms of strength and stability. The measures by which the mutual alignment of the individual optical elements can be guaranteed are impossible to identify.

SUMMARY OF THE INVENTION

Therefore, for the production of a composite made from a plurality of mounted optical lenses, there is the problem of guaranteeing the mutual alignment of optical lenses during assembly and high strength for the composite after the mounting with low expense in terms of equipment.

This problem is solved for a precision mechanical-optical system of the type mentioned above, in such a way that flanges are formed on the mounts, these flanges projecting outward in the radial direction and abutting one another for adjacent mounts, with facing joint surfaces, and are clamped by threaded connections tensioned in the axial direction between paired, opposing bending elements.

By means of the invention, a spring-mounted connection with very high and uniform spring force is created between the individual mounts, wherein a connection force that is essentially comparable to a rigid connection can be generated with this spring-mounted connection. Due to a long and therefore easily measurable spring or adjustment path, uniform tightening forces can be achieved in all of the threaded connections tightening in the axial direction.

Advantageous constructions and refinements result from the dependent claims.

A special construction of the invention provides joint surfaces that have a circular ring-shaped construction and are arranged coaxial to one another and between which several passage boreholes are machined, the passage boreholes of adjacent mounts being aligned with one another.

Because only a very small space is available for lenses, high forces must be generated in a very tight space and on the largest possible measurable path. Especially important is the shape of the high load-carrying bending elements, which must be utilized efficiently in terms of material and which is therefore preferably adapted to the bending moment profile corresponding to a carrier of equal bending loading. In such bending elements, the cross section changes in such a way that under loading, uniform material stresses are generated.

In particular, it is provided that the bending elements are adapted in one dimension to the bending moment profile and exhibit uniform extent in a direction perpendicular to the first dimension. Such bending elements can be formed, e.g., as two-sided triangular springs that have a uniform thickness.

It is also possible for the bending elements to have a variation in one dimension such that, for a flat base surface, a surface above this base surface is curved like an arc and that there is uniform elongation in a direction perpendicular to the first dimension.

For forming the threaded connections tightening in the axial direction, setscrews are provided, which run through the passage boreholes in the flanges with lateral play and which bear, at one end, one bending element that is fixed in place and, at the other end, the other bending element that can move in the axial direction by means of a nut screwed onto the setscrew.

It is further advantageous if the paired, opposing bending elements are arranged with the associated setscrews concentric to the optical axes that are aligned with one another.

The subject matter of the invention is further a method for producing a composite of optical elements held individually in mounts, in which, in a multiple-step calibration and assembly process, at first a threaded connection tightening in the axial direction for the mounts is realized with a partial pre-tensioning force, after which
  the optical axes of the optical elements are aligned flush with one another by lateral displacement of the individually mounted optical elements, and then
  the mounts are screwed together tightened in the axial direction with a biasing force such that a mutually fixed seating of the mounts relative to one another is guaranteed.

BRIEF DESCRIPTION OF THE DRAWINGS

The invention will be explained in more detail below with reference to the annexed drawings in which.

DESCRIPTION OF THE EMBODIMENTS

Figure 1:
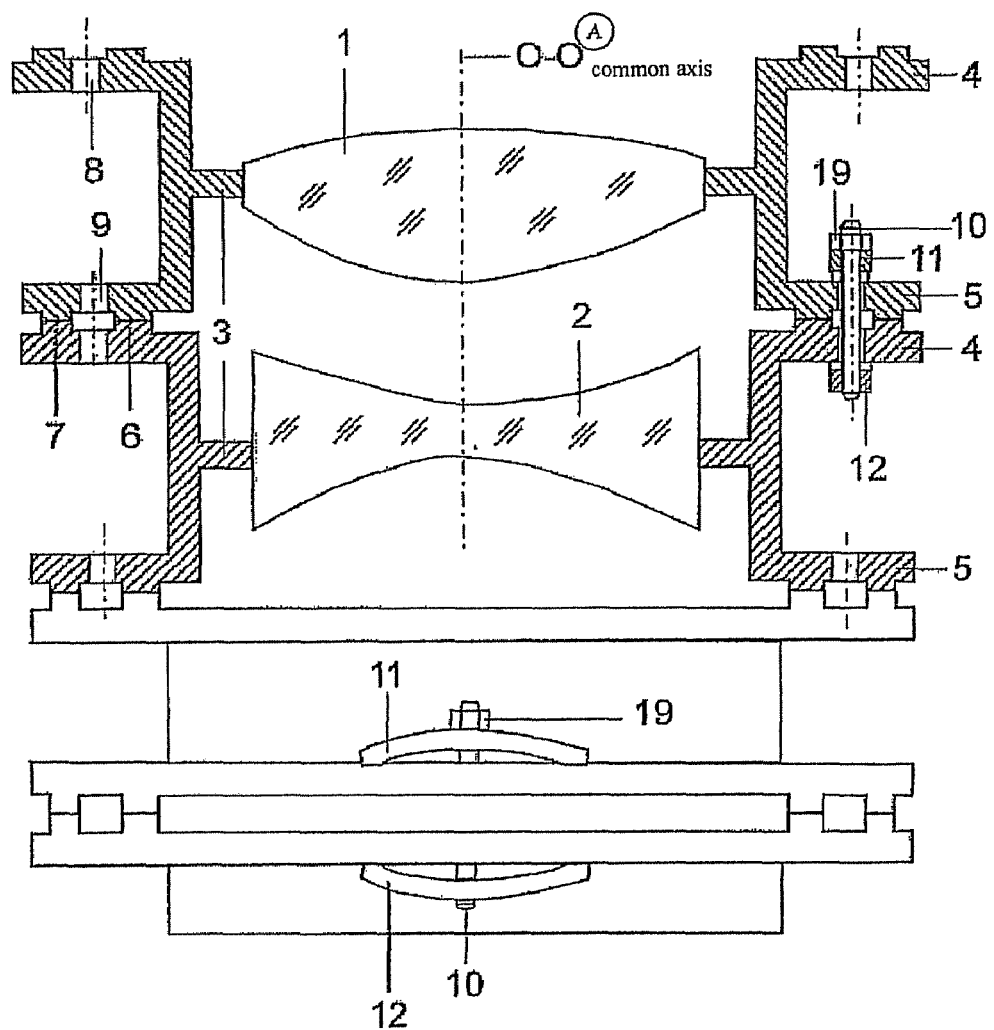
FIG. 1 shows a composite made from mounted optical lenses.

In the composite of optical elements, in particular, optical lenses, shown in FIG. 1 the individual lenses 1, 2 are held with their optical axes in a way that is positionally stable and low in stress in associated mounts 3.

The mounts 3 have, on the outer region, flanges 4, 5 that project outward in the radial direction and which preferably have a completely circumferential construction, so that the flanges 4, 5 form a u-shaped cross section with the mount 3. The flanges 4, 5 are provided, on the front side, with joint surfaces 6, 7, which have a circular ring-shaped construction directed perpendicular to the optical axis of the lens 1 and which are arranged coaxial to one another and which abut one another for adjacent mounts 3, so that the joint surfaces 6, 7 form contact surfaces with the flanges 4, 5 of adjacent mounts 3.

In the flanges 4, 5, several passage boreholes 8, 9 are machined between the joint surfaces 6, 7, with passage boreholes 8, 9 of adjacent mounts 3 being aligned with one another.

For forming threaded connections tightening in the axial direction, setscrews 10 with slight play are guided through the aligned passage boreholes 8, 9, so that for the purpose of calibration, a mutual lateral displacement of the mounts 3 along the joint surfaces 6, 7 is possible. For the calibration, all of the optical axes of the individually mounted optical lenses 1, 2 are aligned flush with one another, so that a common optical axis O-O$_{gemeinsam}$ [O-O$_{common}$] is realized for the composite.

The end regions of the setscrews 10 are connected to bending elements 11, 12, which lie on reverse-side surfaces facing away from each other on the flanges 4, 5 with free ends and with the hollow side toward the connected flanges 4, 5, so that the abutting flanges 4, 5 of adjacent mounts 3 are clamped due to the threaded connection tightening in the axial direction between paired, opposing bending elements 11, 12 with spring forces directed in opposing directions.

Figure 2:
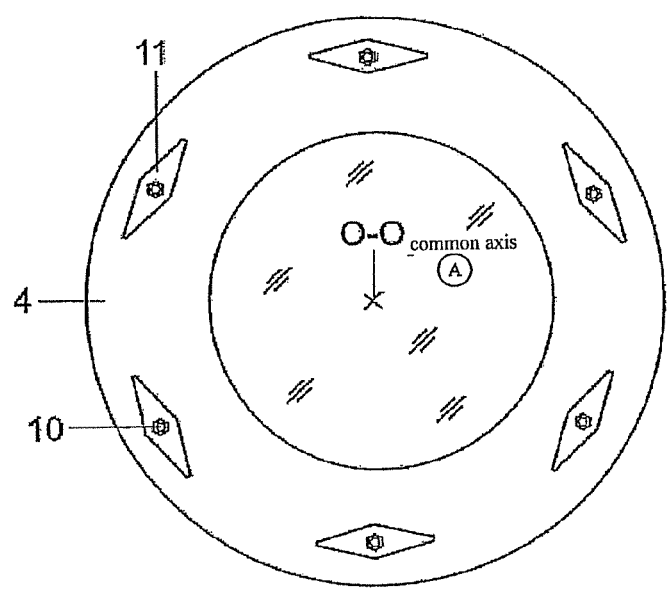
FIG. 2 illustrates an arrangement of paired, opposing bending elements.

According to FIG. 2, the paired, opposing bending elements 11, 12 are arranged with associated setscrews 10 essentially concentric to the optical axes aligned with one another and thus to the common optical axis O-O$_{gemeinsam}$.

Figure 3:
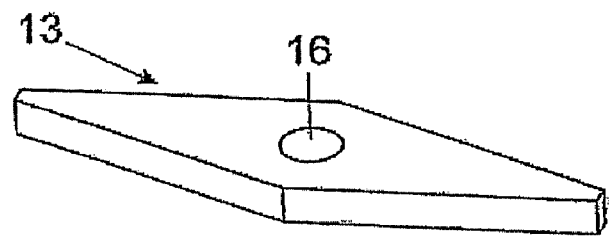
FIG. 3 shows a first construction of a bending element as a two-armed triangular spring in a top view.

In a preferred embodiment according to FIG. 3, the bending elements are formed in the basic shape of two-sided triangular springs 13 of uniform thickness, by means of which the bending elements are adapted by their shape to the bending moment profile, so that there is a carrier of uniform bending loading. The advantage of this embodiment consists in the optimal use of materials, which is especially important for constructions with a lack of space, such as those for lenses. Other shapes for the bending elements are shown in FIGS. 4, 5.

Figure 4:
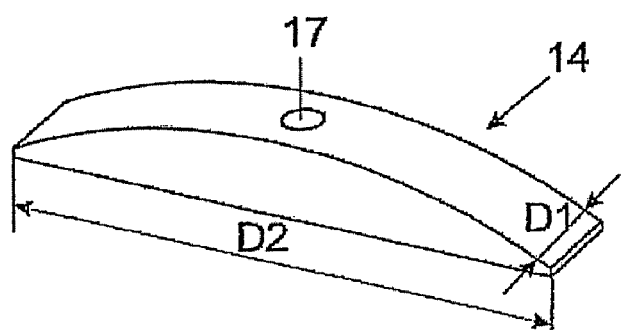
FIG. 4 shows a second construction of the bending element.

The bending element 14 shown in FIG. 4 has, in one dimension D1, a uniform extent and is adapted to the bending moment profile in its extent in a dimension D2 perpendicular to this first dimension, in that the thickness is varied in such a way that an arc is described over a flat base surface.

Figure 5:
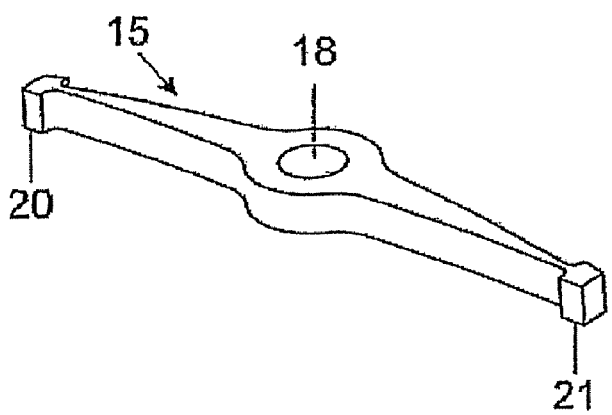
FIG. 5 shows a third construction of the bending element.

The bending element 15 shown in FIG. 5 has a uniform thickness just like the bending element according to FIG. 3 and is adapted in the width extent to the bending moment profile. On both ends of the bending element 15 there are contact surfaces 20, 21 for reducing the surface pressure at the contact position. The size of the contact surfaces 20, 21 is based on the permissible surface pressure of each material that can be selected with high flexibility.

The bending elements 11-15, which can be produced with high uniformity, are each equipped in the middle with a borehole 16-18, which can be formed as passage boreholes or as threaded boreholes.

A bending element pair is constructed according to FIG. 1 advantageously so that one bending element 11 has a threaded borehole and the other bending element 12 has a passage borehole. The setscrew 10 is screwed here with one pin end directly into the threaded borehole of the bending element 11. On the other pin end, which is guided through the passage borehole of the other bending element 12, a nut 19 is screwed on, so that by tightening the nut 19, axial tension can be produced, for which, due to the bending of the two bending elements 11, 12, a defined connection force is generated.

One advantage of the composite according to the invention is that due to the bending elements 11-15, a threaded connection with a flat characteristic line is generated, so that, in contrast to the typically rigidly screwed lens combinations, a biasing force can be generated by means of a relatively large adjustment path. For the bending elements 11-15 proposed here, this path is adequate for sufficiently accurate force measurements as a prerequisite of an easily controllable threaded connection, in order to be able to generate a uniform biasing force on all of the setscrews 10. The controllability and uniformity achieved by the invention for the biasing force on all of the setscrews 10 guarantees that the state of the mounted lenses 1, 2, is adjusted precisely in the tenth of a micrometer range, and is also frozen with this accuracy.

Another advantage of the invention is that the calibration and assembly process can be performed over multiple steps. At first, by tightening the nut 19, only an approximately ten-percent portion of the biasing force is applied, so that adjustment of the mounted lens 1 can still be performed by lateral displacement along the joint surfaces 6, 7. Suitable optical measurement methods are provided, in order to determine the position of the lenses 1, 2. After successful calibration, the full biasing force is set through further tightening of the nut 19, so that a fixed seating of the mounts relative to one another is achieved.

Through the relatively large biasing path, the connection is not sensitive to settling effects, i.e., for slight settling effects, the biasing force on the joint surface 6, 7 is essentially maintained.

The very good controllability and uniformity of the connection of the mounted lenses 1, 2 result in high reproducibility of the connection. This property is a great advantage if individually mounted lenses 1, 2 must be replaced.

The number of setscrews 10 and thus also of bending element pairs is based on the diameter of the mounts and also on the mechanical loads to be supported.

The invention claimed is:

1. A precision mechanical-optical system, comprising a composite of optical elements held in mounts that are screwed together, a plurality of flanges formed on said mounts, said flanges projecting outward in the radial direction and abutting one another of adjacent mounts, said flanges having facing joint surfaces and clamped by threaded connections tightening in the axial direction between paired, opposing bending elements with a spring force directed in opposite directions.

2. The precision mechanical-optical system according to claim 1, wherein said joint surfaces have a circular ring-shaped construction and are arranged coaxial to one another, and wherein several passage boreholes are machined between joint surfaces, said passage boreholes of adjacent mounts being aligned with one another.

3. The precision mechanical-optical system according to claim 1, wherein the shapes of said bending elements are adapted to the bending moment profile in one dimension and have a uniform extent in a direction perpendicular to this first dimension.

4. The precision mechanical-optical system according to claim 3, wherein said bending elements are constructed as two-sided triangular springs which have a uniform thickness.

5. The precision mechanical-optical system according to claim 3, wherein said bending elements have a variation in extent in one dimension such that for a flat base surface, a surface lying above this base surface is curved like an arc and that there is a uniform extent in a direction perpendicular to this first dimension.

6. The precision mechanical-optical system according to claim 1, further comprising setscrews for the formation of threaded connections tightening in the axial direction, said setscrews which run through the passage boreholes in flanges with lateral play and which carry, on one end, one bending element that is fixed in place and on the other end, the other bending element that can move in the axial direction by a nut screwed onto the setscrew.

7. The precision mechanical-optical system according to claim 6, wherein said bending elements are arranged concentric to the aligned optical axes of the optical elements.

8. A method for producing a composite of optical elements held individually in mounts, in a multiple-step calibration and assembly process, comprising tightening a threaded connection in the axial direction for the mounts with a partial biasing force, laterally displacing said mounts to effect lateral displacement of the individually mounted optical elements to thereby align the optical axes of said optical elements with one another, and screwing the mounts with a biasing force tightening in the axial direction in such a way that a mutually fixed seating of the mounts is guaranteed relative to one another.

* * * * *